US011317421B2

(12) United States Patent
Fitch et al.

(10) Patent No.: US 11,317,421 B2
(45) Date of Patent: Apr. 26, 2022

(54) CELLULAR COMMUNICATIONS NETWORK

(71) Applicant: BRITISH TELECOMMUNICATIONS PUBLIC LIMITED COMPANY, London (GB)

(72) Inventors: Michael Fitch, London (GB); Richard Mackenzie, London (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 458 days.

(21) Appl. No.: 15/527,850

(22) PCT Filed: Nov. 13, 2015

(86) PCT No.: PCT/EP2015/076526
§ 371 (c)(1),
(2) Date: May 18, 2017

(87) PCT Pub. No.: WO2016/079017
PCT Pub. Date: May 26, 2016

(65) Prior Publication Data
US 2017/0311333 A1 Oct. 26, 2017

(30) Foreign Application Priority Data

Nov. 20, 2014 (EP) .................................... 14275243

(51) Int. Cl.
*H04W 72/08* (2009.01)
*H04W 16/04* (2009.01)
(Continued)

(52) U.S. Cl.
CPC ......... *H04W 72/082* (2013.01); *H04W 16/04* (2013.01); *H04W 16/14* (2013.01); *H04W 16/32* (2013.01); *H04W 84/045* (2013.01)

(58) Field of Classification Search
CPC ... H04W 16/14; H04W 16/32; H04W 52/243; H04W 72/08; H04W 72/082; H04W 72/0453; H04W 84/045
See application file for complete search history.

(56) References Cited

U.S. PATENT DOCUMENTS

2009/0163221 A1* 6/2009 Abedi ................... H04W 16/10
455/452.1
2010/0020771 A1 1/2010 Ji et al.
(Continued)

FOREIGN PATENT DOCUMENTS

EP 2 073 583 6/2009
JP 2013-115503 6/2013
(Continued)

OTHER PUBLICATIONS

International Search Report for PCT/EP2015/076526, dated Jan. 14, 2016, 4 pages.
(Continued)

*Primary Examiner* — Quoc Thai N Vuz
(74) *Attorney, Agent, or Firm* — Nixon & Vanderhye P.C.

(57) ABSTRACT

This invention relates to a method in a cellular communications network having a plurality of base stations, and to a base station for said cellular communications network, wherein each base station is configured to use a frequency band of one of a hierarchy of spectrum levels, the method comprising: a first base station using a frequency band of a first spectrum level of the hierarchy of spectrum levels; determining an interference level in the network; determining whether the interference level indicates that the first station's performance is sub-optimal; and, if so, the first station reconfiguring to use a frequency band of a second spectrum level of the hierarchy of spectrum levels, the
(Continued)

second spectrum level having a different number of frequency bands than the first spectrum level.

19 Claims, 4 Drawing Sheets

(51) Int. Cl.
*H04W 16/14* (2009.01)
*H04W 16/32* (2009.01)
*H04W 84/04* (2009.01)

(56) References Cited

U.S. PATENT DOCUMENTS

| | | | |
|---|---|---|---|
| 2010/0273468 A1* | 10/2010 | Bienas | H04W 24/02 455/418 |
| 2011/0003598 A1 | 1/2011 | Ma et al. | |
| 2011/0086641 A1 | 4/2011 | Guvenc et al. | |
| 2013/0190027 A1* | 7/2013 | Cao | H04W 52/0206 455/509 |
| 2014/0031031 A1* | 1/2014 | Gauvreau | H04L 5/0053 455/426.1 |
| 2014/0128088 A1* | 5/2014 | Farhadi | H04W 16/14 455/452.1 |
| 2015/0009907 A1* | 1/2015 | Merlin | H04W 74/0808 370/329 |
| 2016/0081084 A1* | 3/2016 | Blankenship | H04W 4/70 370/329 |

FOREIGN PATENT DOCUMENTS

| | | |
|---|---|---|
| WO | WO 2010/105232 | 9/2010 |
| WO | WO 2014/073706 | 5/2014 |

OTHER PUBLICATIONS

Written Opinion of the ISA for PCT/EP2015/076526, dated Jan. 14, 2016, 8 pages.
Search Report for EP Appln No. 14275243.5, dated May 28, 2015, 12 pages.
Written Opinion of the International Preliminary Examining Authority for PCT/EP2015/076526, dated Nov. 15, 2016, 7 pages.
International Preliminary Examination Report for PCT/EP2015/076526, dated Feb. 20, 2017, 23 pages.
"Enabling Hyper-Dense Small Cell Deployments with UltraSON", Qualcomm Research, *Qualcomm Technologies, Inc.*, Feb. 8, 2014, 21 pages.
"Broadband Radio Access Networks (BRAN); Very high capacity density BWA networks; Protocols", Technical Report, European Telecommunications Standards Institute (ETSI), vol. BRAN, No. V1.1.1, Jul. 1, 2013, 57 pages.
Wikipedia Article: "Radio Spectrum", https://en.wikipedia.org/w/index.php?title=Radio_spectrum&oldid=698517105 Jan. 7, 2016, pp. 1-12.
3GPP A Global Initiative Presentation, "LTE Radio Layer 2, RRC and Radio Access Network Architecture", Arnaud Meylan, Huawei, 3GPP TSG-RAN WG2, 2010 (44 pgs.).
Result of consultation dated Aug. 6, 2018 issued in European Application No. 15 794 562.7 (3 pages).
First Notification of Office Action dated Jul. 30, 2019 issued in Chinese Application No. 201580062682.1 (7 pages).

* cited by examiner

CELLULAR COMMUNICATIONS NETWORK

This application is the U.S. national phase of International Application No. PCT/EP2015/076526 filed 13 Nov. 2015, which designated the U.S. and claims priority to EP Patent Application No. 14275243.5 filed 20 Nov. 2014, the entire contents of each of which are hereby incorporated by reference.

FIELD OF THE INVENTION

The present invention relates to a cellular communications network. In particular, this invention relates to base station spectrum allocation in a cellular communications network.

BACKGROUND TO THE INVENTION

A typical cellular communications network comprises a plurality of base stations each supporting a coverage area (a "cell"). Each base station communicates with one or more User Equipment (UEs, or sometimes known as Mobile Terminals (MT), User Terminals (UT) or mobiles) using a radio transmission medium and a particular protocol, such as the $4^{th}$ Generation (4G) Long Term Evolution (LTE) protocol. Each protocol specifies a communication spectrum (i.e. a range of frequencies of electromagnetic radiation) which is shared by all base stations for their respective communications with UEs in their cell. These base station to UE communications may therefore occupy the same transmission frequency and be at the same time, in which case interference can occur and throughput is reduced. Accordingly, when base stations use a shared spectrum (such as when base stations operate according to the same protocol or two protocols having overlapping spectrums), they must use interference mitigation techniques. These include multiplexing, transmit power adaptation, antenna directivity and other techniques.

An emerging technology in cellular communications networks is the femtocell, being one of a class of small cells (also known as Home evolved Node B (HeNB). These small cells typically operate over a much smaller coverage area than used by traditional base stations, having a coverage area of tens of metres. The femtocell is installed in a customer's premises, such as the customer's home or office environment, and acts as a base station to provide radio access to the cellular communications network. The femtocell therefore has a backhaul connection to the cellular communications network, typically over the femtocell's xDSL connection.

It is expected that femtocells will be widely deployed as they offer users greater data rates via their cellular communications network when using a UE in or around their premises. However, femtocells will be deployed and installed by end-users so the traditional techniques of controlling transmit powers and antenna direction cannot be used to mitigate interference. Accordingly, interference between two femtocells (i.e. co-tier co-frequency band interference) has to be carefully managed in order to ensure a balance between data rates and errors or faults in the network.

One way of addressing this has been proposed in European Patent Application Publication Number 2073583 A2. This discloses that two femtocells can dynamically vary their own spectrum allocations depending on their load. The embodiments of this disclosure illustrate that when one femtocell has excessive load (e.g. due to a large number of UEs communicating with the femtocell) such that it is experiencing an excessive interference level, it may negotiate a transfer of spectrum from another femtocell. This allows one femtocell to increase its spectrum bandwidth at the expense of the other femtocell, but of course means that the other femtocell offers reduced data rates and may experience increased levels of interference.

A well-known form of interference in a cellular communications network is pilot pollution. Each base station transmits one or more pilot signals throughout the cell. The format of each pilot signal is known by all UEs in the cell, and are used for various purposes such as frequency band estimation, frequency band quality measurement, signal strength measurement, synchronization, etc. An example of a pilot signal is the Primary Synchronisation Signal (PSS) used in 4G LTE. The PSS is transmitted by a base station to a UE in its coverage area, which can then be detected and decoded by the UE as part of the synchronisation process.

Base stations in cellular networks transmit a variety of pilot signals about their coverage areas. However, when a UE is located within an overlapping coverage area of two base stations (e.g. its serving base station and a neighbouring base station), and thus receives both pilot signals from both base stations, the UE may be unable to determine which pilot signal was transmitted by which base station. This problem is known as pilot pollution.

This problem is relatively easy to overcome when using macrocell base stations. For example, Network Operators can plan the locations of the base stations and adjust each base station's antenna beam direction to reduce the occurrence of pilot signals being received by a UE from different base stations at the same signal strength. However, for self-deployed femtocell networks, these solutions are unsuitable. To date, the problem of pilot pollution in femtocell networks has been addressed by initially setting the power level, bandwidth etc. of each femtocell, and, if pilot pollution is detected, then it is resolved on an incident by incident basis.

One method of addressing this problem has been proposed in an article "Enabling Hyper-Dense Small Cell Deployments with UltraSON™ by Qualcomm Technologies, Inc. on 8 Feb. 2014. In Section 3.4.1 of this article ("Tx Power Management"), the author suggests that a small cell periodically performs RF measurements of other small cell's pilot frequency bands, and uses this data to determine its own transmit power level. Accordingly, the small cell's power level may be dynamically adjusted in response to the changing RF environment, reducing the likelihood of pilot pollution. However, it also has the effect of reducing the coverage area of the small cell, which could be frustrating for end-users.

It is therefore desirable to alleviate some or all of the above problems.

SUMMARY OF THE INVENTION

According to a first aspect of the invention, there is provided a method in a cellular communications network having a plurality of base stations, wherein each base station stores data representing a hierarchy of spectrum levels each defining one or more frequency bands in which the base station may operate, wherein a lower order level of the hierarchy of spectrum levels includes a greater number of frequency bands than a higher order level, the method comprising the steps of: a first base station using a frequency band of a first spectrum level of the hierarchy of spectrum levels; determining an interference level in the network; determining whether the interference level meets a first threshold indicating that the first base station's performance is sub-optimal; and, if so, the first base station reconfiguring to use a frequency band of a second spectrum level of the hierarchy of spectrum levels, the second spectrum level having a different number of frequency bands than the first spectrum level.

A base station may therefore dynamically reconfigure its spectrum usage in order to react to changing conditions in the cellular communications network. This is achieved by reconfiguring to use an alternative spectrum level in a hierarchy of spectrum levels, wherein the alternative spectrum level has a different number of frequency bands than the previous spectrum level. Accordingly, if the base station reconfigures to use a spectrum level having a greater number of frequency bands, the density of femtocells on those frequency bands will be less resulting in less co-tier co-frequency band interference. This may also reduce pilot pollution, without reducing the transmit power level of the base station (which would otherwise reduce the coverage area). Furthermore, if the base station reconfigures to a spectrum level having fewer frequency bands, there is more bandwidth in each frequency band which results in greater data rates.

If the determined interference level is above a first threshold, the second spectrum level has a greater number of frequency bands than the first spectrum level. Alternatively, if the determined interference level indicates that interference is below the first threshold, the second spectrum level has fewer frequency bands than the first spectrum level.

The determined interference level may indicate that the interference is below the first threshold and below a second threshold, and the method may further comprise the steps of: the first base station assessing an interference level of a first frequency band in the second spectrum level; and the first base station reconfiguring to use the first frequency band of the second spectrum level, wherein the second spectrum level is a higher order level having fewer frequency bands than the first spectrum level.

The first base station may assess an interference level of a first frequency band in the second spectrum level; and the first base station may reconfigure to use the first frequency band of the second spectrum level. Accordingly, the base station may analyse the environment of the frequency bands in an alternative spectrum level, and select one having the most appropriate characteristics.

A second base station may have an overlapping coverage area with the first base station, the method further comprising the steps of: the second base station reconfiguring to use a frequency band of the second spectrum level. In this manner, a cluster of several neighbouring base stations may all reconfigure to an alternative spectrum level.

The step of determining whether the interference level indicates that performance is sub-optimal may include determining whether a previous reconfiguration improved performance. Thus, the base station may learn from previous reconfigurations whether a change in spectrum level improved performance.

Also provided is a non-transitory computer-readable storage medium storing a computer program or suite of computer programs which upon execution by a computer system performs the method of the first aspect of the invention.

According to a second aspect of the invention, there is provided a base station for a cellular communications network, the base station comprising: a transceiver for communicating with a User Equipment (UE); a memory storing data representing a hierarchy of spectrum levels each defining one or more frequency bands in which the base station may operate, wherein a lower order level of the hierarchy of spectrum levels includes a greater number of frequency bands than a higher order level; and processor adapted to configure communications between the transceiver and the UE, wherein, in response to an interference level in the network meeting a first threshold indicating that the base station's performance is sub-optimal, the processor is adapted to reconfigure the transceiver from using a frequency band of a first level of a hierarchy of spectrum levels to using a frequency band of a second level of the hierarchy of spectrum levels, the second spectrum level having a different number of frequency bands than the first spectrum level.

If the network interference level is above a first threshold, the second spectrum level has a greater number of frequency bands than the first spectrum level. Alternatively, if the network interference level is below the first threshold, the second spectrum level has fewer frequency bands than the first spectrum level.

The processor may be adapted to determine the interference level in the network and to determine whether the interference level indicates that the base station's performance is sub-optimal.

The processor may be further adapted to assess an interference level of a first frequency band in the second spectrum level, and to reconfigure the transceiver to use the first frequency band of the second spectrum level.

The processor may be adapted to cause the transceiver to send a message to a second base station, the second base station having an overlapping coverage area with the first base station, indicating that the second base station should reconfigure to use a frequency band of the second spectrum level.

The base station may further comprise a memory storing data representing the hierarchy of spectrum levels. The base station may be a Home evolved Node B (including a femtocell or any other form of small cell).

A cellular communications network is also provided, comprising a base station of the second aspect of the invention.

BRIEF DESCRIPTION OF THE FIGURES

In order that the present invention may be better understood, embodiments thereof will now be described, by way of example only, with reference to the accompanying drawings in which.

DETAILED DESCRIPTION OF EMBODIMENTS

Figure 1:
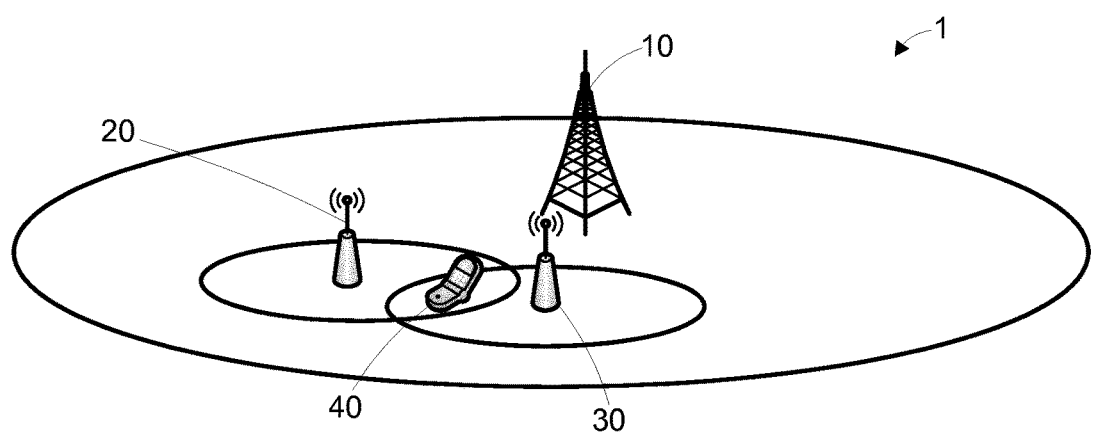
FIG. 1 is a schematic diagram of an embodiment of a cellular communications network of the present invention, including a base station, first and second femtocell and a User Equipment.

An embodiment of a cellular communications network 1 will now be described with reference to FIGS. 1 to 3. As shown in FIG. 1, the cellular communications network 1 includes a first base station 10 (also known as a Node B (NB) or evolved Node B (eNB) depending on the communications protocol used) serving a large coverage area (hereinafter, the "macrocell"), a first and second femtocell 20, 30 (a form of small cell, also known as a Home evolved Node B (HeNB)) each serving a first and second coverage area, and a User Equipment 40 (UE, also known as a Mobile Terminal (MT), User Terminal (UT) or mobile). The first and second coverage areas of the first and second femtocells 20, 30 are overlapping and the UE is located within this overlapping coverage area. In this embodiment, the UE 40 is connected to the first femtocell 20.

Figure 2:
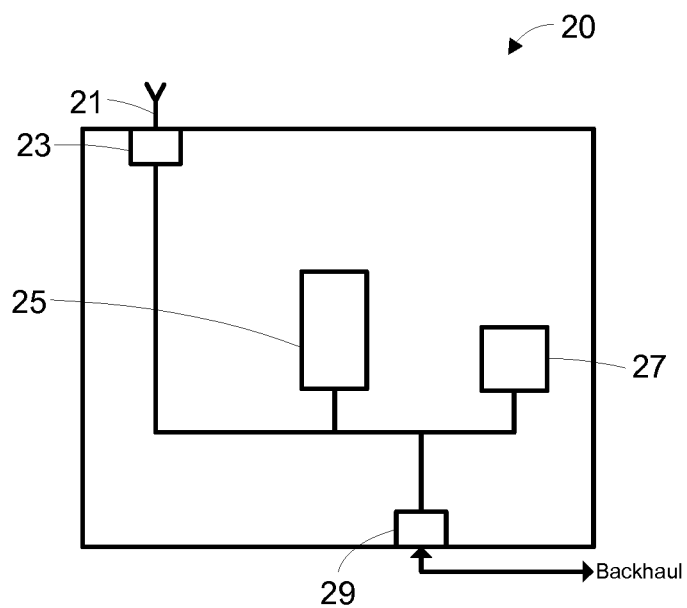
FIG. 2 is a schematic diagram of the first femtocell of FIG. 1.
Figure 3:
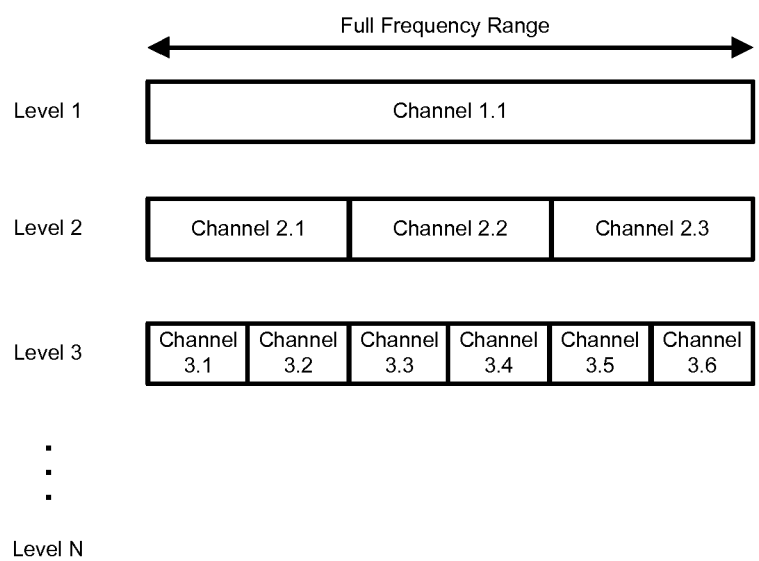
FIG. 3 illustrates a hierarchy of spectrum levels used in the network of FIG. 1.

A schematic overview of the first femtocell 20 is shown in FIG. 2. The first femtocell 20 includes an antenna 21 and RF front end 23, which together form a transceiver for sending and receiving transmissions with other wireless entities (such as the UE 40), and a backhaul interface 29, which is typically used to connect the femtocell 20 to external networks (such as the Internet) but also to connect the femtocell 20 with other entities in the cellular communications network 1 (such as the base station 10 or second femtocell 30). The femtocell 20 also includes a processor 25 and memory 27.

The skilled person will understand that the second femtocell 30 may have an identical configuration to the first femtocell 20. Furthermore, the base station 10 may have a similar configuration to the first femtocell 20, although its components are adapted for transmissions over a large coverage area. Still furthermore, the UE 40 may have a similar configuration to the first femtocell 20, although it would not require a backhaul connection and would typically also include further components (such as a microphone and a display) such that a user may interact with applications on the UE 40.

In this embodiment, the base station 10, first and second femtocells 20, 30 and the UE 40 are all configured for cellular communications according to the 4G LTE protocol. In an embodiment of an aspect of this invention, the base station 10 and the first and second femtocells 20, 30 are all configured to operate using one of a plurality of spectrum levels, wherein each spectrum level includes one or more frequency bands. The hierarchical arrangement of these levels is shown in more detail in FIG. 3. As shown, each level uses the full frequency range allowed by the protocol but is divided into one or more frequency bands each having a distinct centre frequency, such that a lower order level in the hierarchy includes a greater number of frequency bands than a higher order level. In this embodiment, Level 1 (the highest order level of the hierarchy) is a single frequency band and therefore uses the full spectrum allowed by the 4G LTE protocol, and each level below contains a successively greater number of frequency bands each having a smaller bandwidth. Each base station in the cellular communications network includes a memory (such as memory 27 of the first femtocell 20) storing data representing the hierarchy of spectrum levels, including identifiers, centre frequencies and bandwidth (i.e. frequency range) of each frequency band of each level in the hierarchy.

Figure 4:
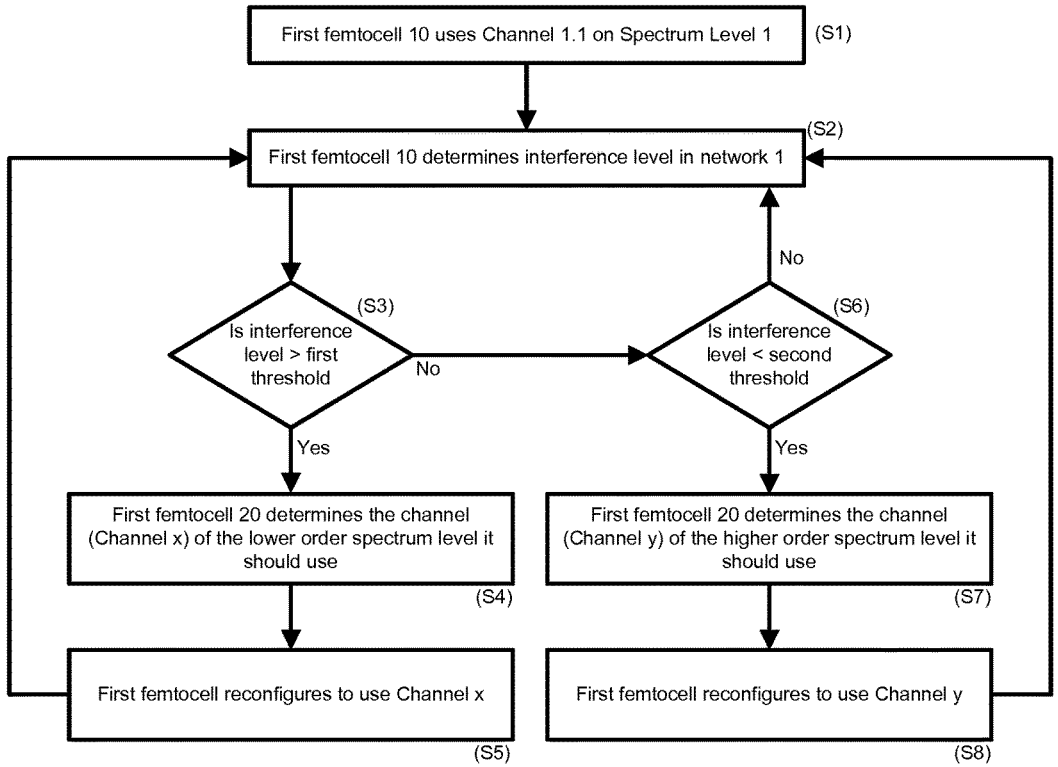
FIG. 4 is a flow diagram illustrating an embodiment of a method of the present invention.

As will be described in more detail below in respect of the method aspect of the invention, base stations in the cellular communications network 1 are able to adapt their own spectrum allocation to any one of these frequency bands in response to changing conditions on the network. This may be implemented by a base station scheduler (which may be part of a processing module on the base station) reallocating its Resource Blocks (RBs) such that it uses only the frequency range defined by its frequency band allocation. An embodiment of the present invention will now be described with reference to FIG. 4.

Initially, the first femtocell 20 is operating in Frequency band 1.1 on Level 1 of the hierarchy of spectrum levels (step S1). Furthermore, the base station 10 and the second femtocell 30 are also operating in Frequency band 1.1 of Level 1 of the hierarchy of spectrum levels. As shown in FIG. 3, Frequency band 1.1 is the single frequency band of Level 1 and thus uses the full spectrum of the 4G LTE protocol. Accordingly, the base station 10 and the two femtocells 20, 30 share the same frequency range and therefore use one or more co-tier co-frequency band interference mitigation techniques in order to minimize interference in the network 1. This may include RB selection algorithms that aim to minimize the probability that the two femtocells select the same RB for a transmission to a UE.

The network 1 experiences temporal fluctuations in interference across the frequency range. This typically arises due to an increased load on each base station, but can also occur due to climatic changes. In this embodiment, the first femtocell 20 periodically determines a level of interference in the network (step S2), specifically the level of interference of its current operational frequency band and of each frequency band in the level above and below its current level. This may be carried out in a number of ways, including evaluating the total number of neighbouring base stations, the frequency band being used by each neighbouring base station, the Reference Signal Received Power (RSRP) of each neighbouring base station, the first femtocell's 20 transmit power level and the Signal to Noise plus Interference Ratio (SNIR) across the full spectrum of the network 1. This information may be gathered directly through a network listen operation, via measurement reports from UEs, such as UE 40, and/or via message exchange with other base stations in the network 1. The first femtocell 20 then determines, from this information and the data representing the hierarchy of spectrum levels stored in memory 27, the level of interference in the frequency band it is operating in (Frequency band 1.1 of Level 1) and the level of interference in each frequency band in the level below its current level (Frequency bands 2.1, 2.2 and 2.3 of Level 2). In this first example, the first femtocell 20 is operating in the highest level of the hierarchy and therefore only assesses the level of interference in the level below.

The first femtocell 20 then determines whether the interference level in its current frequency band is above or below a first threshold (step S3). In this first iteration of the method of FIG. 4, the interference level is above the first threshold, which indicates that the first femtocell 20 is operating sub-optimally due to excessive interference. The skilled person will understand that this may be caused by a high density of neighbouring femtocells (such as the second femtocell 30) using the same frequency band.

Following this determination, the first femtocell 20 reconfigures such that it operates on Level 2 of the hierarchy of spectrum levels. This involves several steps. Firstly, in step S4, the first femtocell 20 (which made the initial determination that the interference level is above a threshold) determines which frequency band of Level 2 of the hierarchy of spectrum allocation levels it should use. This is based on the frequency band interference measurements previously made by the first femtocell 20, and may also take into account the load on both the first femtocell 20 and any base station currently using any one of the Level 2 frequency bands (and potentially frequency bands on other levels of the hierarchy) such that the first femtocell 20 selects the most appropriate frequency band from the network's perspective (the load of other base stations may be determined from the network listen operation). In this example, the first femtocell 20 determines that it should use Frequency band 2.2. Accordingly, the first femtocell 20 determines the frequency range for Frequency band 2.2 using the data stored in memory 27, and the first femtocell's 20 scheduler (implemented by the processor 25) thereafter only allocates RBs from this frequency range for future communications with all camped UEs (such as UE 40) (step S5). The first femtocell 20 may then use traditional co-tier co-frequency band interference techniques in order to minimize interference with any other base station using this frequency band.

The skilled person will understand that once the first femtocell 20 reconfigures to use the new frequency band, each UE connected to the first femtocell 20 prior to the reconfiguration will need to resynchronize. Thus, in the UE's next cell search operation, it will find the first femtocell 20 with a new centre frequency and frequency band bandwidth (decoded from the MIB) and will connect to it in the usual manner. The process then loops back to step S2, in which the first femtocell 20 periodically determines the level of interference in the network. In the next iteration of this method, the first femtocell 20 determines the level of interference in the frequency band it is operating in (Frequency band 2.2) and the level of interference in all frequency bands of levels above and below its current level (that is, Frequency band 1.1 of Level 1 and Frequency bands 3.1 to 3.6 of Level 3). Again, this may be by a network listen operation, using measurement reports from camped UEs, or via message exchange with other base stations in the network 1. In step S3, the first femtocell 20 determines whether the interference level is above or below the first threshold. In this iteration of the method, the interference level is below the first threshold. Thus, in step S6, the first femtocell 20 then determines whether the interference level is above or below a second threshold. If the first femtocell 20 is above the second threshold, the first femtocell 20 determines that there is a normal level of interference in the network and the process loops back to step S2. However, in this example, the interference level is below the second threshold, which indicates that the first femtocell 20 is operating sub-optimally as it would be possible to increase its spectrum allocation without causing excessive interference in the network.

Following this determination, the first femtocell 20 determines which frequency band of the higher order spectrum level it should use (step S7). Of course, as Level 1 only includes a single frequency band, it determines that it should use Frequency band 1.1. Accordingly, the first femtocell's 20 scheduler (implemented in processor 25) is reconfigured such that it uses all RBs available within Frequency band 1.1, as defined by the data in memory 27 (step S8), and the UE's resynchronize with the first femtocell 20.

Accordingly, the first femtocell 20 may dynamically reconfigure its spectrum usage in order to react to changing conditions in the network 1. This is achieved by moving up or down a spectrum level in a hierarchy of spectrum levels. Each lower order level has a greater number of frequency bands than a higher order level, such that by moving down a level there is a tendency that less femtocells will be using a frequency band on that level (resulting in less co-tier co-frequency band interference, including less pilot pollution), and by moving up a level there is greater bandwidth in each frequency band on that level (resulting in greater data rates). Accordingly, when a femtocell measures the interference on the network and determines that the level of interference is too high (i.e. it is above the first threshold), it may move down to a level having a greater number of (smaller bandwidth) frequency bands. The femtocell therefore sacrifices available bandwidth in favour of reduced interference. Conversely, when a femtocell measures the interference on the network and determines that the level of interference is low enough that its spectrum allocation may be increased (i.e. it is below the second threshold), it may move up to a level having fewer frequency bands, but each having greater bandwidth.

The skilled person will understand that the first femtocell 20 may implement this method autonomously, such that each femtocell in the network can react to its network environment automatically and dynamically without intervention from a network controller.

In a modification of the above embodiment, a cluster of femtocells may reconfigure their spectrum usage in order to react to changing conditions in the network using the method of the present invention. In this modification, the first femtocell 10 may determine that both the first and second femtocell 20 (i.e. its neighbouring femtocell) should reconfigure their spectrum usage in response to the interference on the network being either higher than the first threshold or lower than the second threshold. The first femtocell 10 may then determine which frequency bands of the higher or lower spectrum level the first and second femtocells 10, 20 should use (e.g. based on the measured interference of these frequency bands and each femtocell's load, which may be based on UE measurement reports or message exchange between the base stations). The first femtocell 10 may then send a command to the second femtocell 20, indicating that it must reconfigure to use its allocated frequency band. The first and second femtocell 10, 20 may then reconfigure their transmissions to use their respective frequency bands by only using RBs within the frequency ranges of these frequency bands (this may be determined from the data stored in memory).

The skilled person will understand that the above modification may be extended such that any number of neighbouring femtocells (i.e. femtocells having an overlapping coverage area) may reconfigure their spectrum usage using the method of the present invention. In this arrangement, it may be preferable for the allocation of frequency bands to be determined by a network controller.

The skilled person will understand that different measurements of the network interference may be used when determining whether the interference is above or below the first and second thresholds. For example, when determining if the interference is above the first threshold (such that the femtocell is determining whether the interference is so high that a lower order frequency band would be preferable), the femtocell may use SNIR to assess the level of interference. In another example, when determining if the interference is below the second threshold (such that the femtocell is determining whether the interference is so low that if it increased its bandwidth, the interference would be acceptable), the femtocell may determine the number of neighbouring femtocells using each frequency band and the RSRP values for each of these neighbouring femtocells.

Furthermore, the skilled person will understand that using thresholds is not the only way the femtocell may determine whether it should move up or down a spectrum level. For example, the femtocell may keep a record of previous decisions in which it has moved to another spectrum level, including the measurements on the network at the time the decision was made. It may then determine whether this improved performance or not, and factor this in when determining whether it should now change spectrum level. This information could also be used to modify the threshold levels.

The skilled person will also understand that particular parameters may be assessed to determine the interference level in the network. For example, the first femtocell 20 may determine the pilot pollution to determine the interference level in the network, which includes comparing the Reference Signal Received Quality (RSRQ) with the RSRP.

The skilled person will also understand that if a femtocell is already using the highest or lowest order spectrum level in the hierarchy, it of course cannot move to a higher or lower order respectively. This determination may be made after the femtocell has decided to either move up or down a spectrum level, at which point it simply loops back to step S2.

In the embodiment above, each lower order level on the hierarchy of spectrum levels has a greater number of frequency bands than a higher order level. In one arrangement, each frequency band within a spectrum level may have the same bandwidth, although this is non-essential. Thus, the average bandwidth of frequency bands on a lower order level is less than the average bandwidth of frequency bands on a higher order level.

Furthermore, it is non-essential for the frequency bands of each level of the hierarchy to use the full frequency range available in a particular protocol. Instead, each level may use a substantial amount of the frequency band, and there may also be gaps between each frequency band (i.e. a guard band) in any one of the levels. Furthermore, the skilled person will understand that a Network Operator may set the particular hierarchy of spectrum levels, which may then be sent to each femtocell and stored in memory.

The skilled person will understand that any combination of features is possible within the scope of the invention, as claimed.

The invention claimed is:

1. A method in a cellular communications network having a plurality of base stations, wherein each base station stores data representing a hierarchy of spectrum levels each defining one or more frequency bands in which the base station may operate for both user plane data and control plane data, wherein a lower order level of the hierarchy of spectrum levels includes a greater number of frequency bands than a higher order level, the method comprising the steps of:
    a first base station using a frequency band of a first spectrum level of the hierarchy of spectrum levels to transmit both control plane data and user plane data;
    determining an interference level in the network;
    determining whether the interference level meets a first threshold indicating that the first base station's performance is sub-optimal; and, if so,
    the first base station reconfiguring to use a frequency band of a second spectrum level of the hierarchy of spectrum levels to transmit both the control plane data and the user plane data, the second spectrum level having a different number of frequency bands than the first spectrum level.

2. A method as claimed in claim 1, wherein the determined interference level is above a first threshold, and the second spectrum level is a lower order level having a greater number of frequency bands than the first spectrum level.

3. A method as claimed in claim 1, wherein the determined interference level indicates that interference is below the first threshold, and the second spectrum level is a higher order level having fewer frequency bands than the first spectrum level.

4. A method as claimed in claim 3, wherein the determined interference level indicates that the interference is below the first threshold and below a second threshold, wherein the second threshold is less than the first threshold, the method further comprising the steps of:
    the first base station assessing an interference level of a first frequency band in the second spectrum level; and
    the first base station reconfiguring to use the first frequency band of the second spectrum level to transmit the user plane data, wherein the second spectrum level is a higher order level having fewer frequency bands than the first spectrum level.

5. A method as claimed in claim 1, further comprising the steps of:
    the first base station assessing an interference level of a first frequency band in the second spectrum level; and
    the first base station reconfiguring to use the first frequency band of the second spectrum level to transmit the user plane data.

6. A method as claimed in claim 1, wherein a second base station has an overlapping coverage area with the first base station, the method further comprising the steps of:
    the second base station reconfiguring to use a frequency band of the second spectrum level.

7. A method as claimed in claim 1, wherein the step of determining whether the interference level indicates that performance is sub-optimal includes determining whether a previous reconfiguration improved performance.

8. A non-transitory computer-readable storage medium storing a computer program or suite of computer programs which upon execution by a computer system performs the method in claim 1.

9. The method as in claim 1, further comprising the step of performing a network listen operation to determine the load of another base station, wherein the reconfiguration of the first base station to use the frequency band of the second spectrum level of the hierarchy of spectrum levels is based on the determined interference level and based on a load on the first base station and any other base station currently using any one of the frequency bands of the second spectrum level.

10. A base station for a cellular communications network, the base station comprising:
    a transceiver for communicating with a User Equipment (UE);
    a memory storing data representing a hierarchy of spectrum levels each defining one or more frequency bands in which the base station may operate for both user plane data and control plane data, wherein a lower order level of the hierarchy of spectrum levels includes a greater number of frequency bands than a higher order level; and
    a processor adapted to configure communications between the transceiver and the UE, wherein, in response to an interference level in the network meeting a first threshold indicating that the base station's performance is sub-optimal, the processor is adapted to reconfigure the transceiver from using a frequency band of a first level of a hierarchy of spectrum levels for transmitting both control plane data and user plane data to using a frequency band of a second level of the hierarchy of spectrum levels to transmit both the control plane data and the user plane data, the second spectrum level having a different number of frequency bands than the first spectrum level.

11. A base station as claimed in claim 10, wherein the network interference level is above a first threshold, and the second spectrum level is a lower order level having a greater number of frequency bands than the first spectrum level.

12. A base station as claimed in claim 10, wherein the network interference level is below the first threshold, and the second spectrum level is a higher order level having fewer frequency bands than the first spectrum level.

13. A base station as claimed in claim 10, wherein the network interference level is below the first threshold and below a second threshold, wherein the second threshold is less than the first threshold, and the processor is further adapted to assesan interference level of a first frequency band in the second spectrum level, and to reconfigure the transceiver to use the first frequency band of the second spectrum level to transmit the user plane data, wherein the second spectrum level is a higher order level having fewer frequency bands than the first spectrum level.

14. A base station as claimed in claim 10, wherein the processor is adapted to determine the interference level in the network and to determine whether the interference level indicates that the base station's performance is sub-optimal.

15. A base station as claimed in claim 14, wherein the processor is further adapted to assess an interference level of a first frequency band in the second spectrum level, and to reconfigure the transceiver to use the first frequency band of the second spectrum level to transmit the user plane data.

16. A base station as claimed in claim 10, wherein the processor is adapted to cause the transceiver to send a message to a second base station, the second base station having an overlapping coverage area with the first base station, indicating that the second base station should reconfigure to use a frequency band of the second spectrum level.

17. A base station as claimed in claim 10, being a Home evolved Node B.

18. A cellular communications network comprises a base station as claimed in claim 10.

19. The base station as in claim 10, wherein a network listen operation is performed to determine the load of another base station, and wherein the reconfiguration of the transceiver of the base station to use the frequency band of the second spectrum level of the hierarchy of spectrum levels is based on the interference level in the network and based on a load on the base station and any other base station currently using any one of the frequency bands of the second spectrum level.

* * * * *